United States Patent [19]
Sheppard

[11] 3,874,102
[45] Apr. 1, 1975

[54] SLOWED ALTERNATING CURRENT MAGNETIC NOVELTY

[76] Inventor: Elwood H. Sheppard, 223 Bonita Pl., Denver, Colo. 80234

[22] Filed: Nov. 7, 1973

[21] Appl. No.: 413,672

[52] U.S. Cl. .............................................. 40/106.45
[51] Int. Cl. ............................................. G09f 19/02
[58] Field of Search ...... 40/106.45, 106.41; 46/239, 46/234–235

[56] References Cited
UNITED STATES PATENTS

| | | | |
|---|---|---|---|
| 312,178 | 2/1885 | Bacon | 40/106.45 X |
| 1,091,339 | 3/1914 | Howarth | 46/239 X |
| 1,763,788 | 6/1930 | Jobe, Sr. | 46/235 |
| 3,425,157 | 2/1969 | Hartsock | 46/239 X |

*Primary Examiner*—Robert W. Michell
*Assistant Examiner*—John H. Wolff

[57] ABSTRACT

This device consists primarily of a base upon which a figurine is secured having a pole and line with a fish or the like attached, the fish having magnet means spaced above the top surface of the base which will be activated by electro-magnetic force of a coil within the base, the coil being supplied by electricity from an outlet or other source.

1 Claim, 3 Drawing Figures

PATENTED APR 1 1975  3,874,102

SLOWED ALTERNATING CURRENT MAGNETIC NOVELTY

This invention relates to novel and animated devices, and more particularly to a magnetically operated device.

It is therefore the principal object of this invention to provide an animated electrical device which will move a fish or other object in an oscillating and rotating manner.

Another object of this invention is to provide a device of the type described which will include a hollow base structure which will have on its interior an electromagnetic coil which is wired in series with a rectifier switching device so as to cause the object with a permanent magnet above the base to move.

Still another object of this invention is to provide an electrical device which will have a figurine secured to the top of the base, the figurine having a flexible pole with a line attached to the fish having the permanent magnet secured within its tail, the motion also being an up and down motion as well as a rotary and other gyrating motions.

Other objects of the invention are to provide a device which is simple in design, inexpensive to manufacture, rugged in construction, easy to use and efficient in operation.

These and other objects will become readily evident upon a study of the following specification together with the accompanying drawing wherein.

Figure 1:
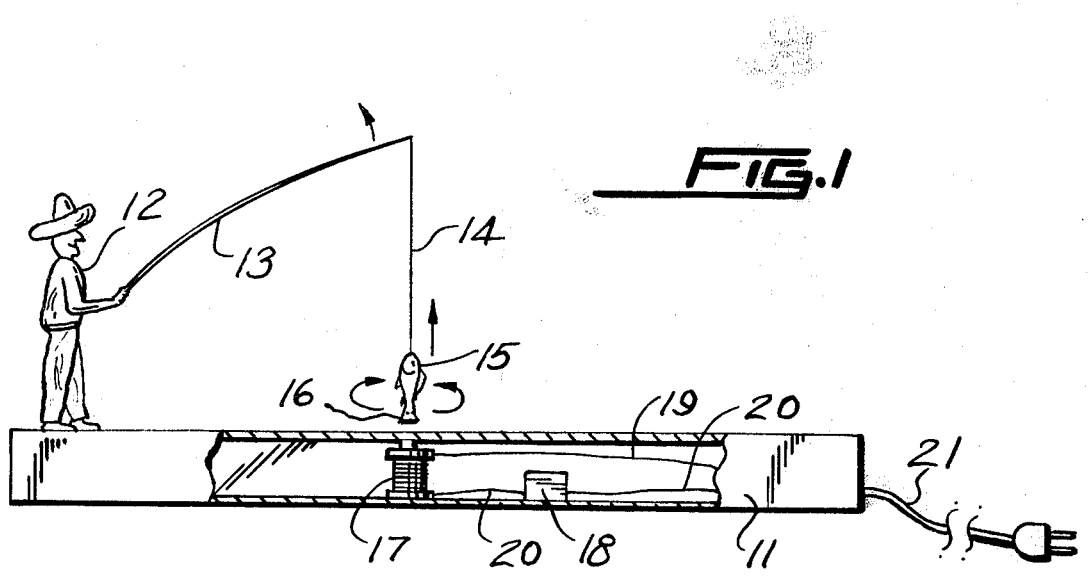
FIG. 1 is a side view of the present invention shown in elevation and partly broken away.
Figure 2:
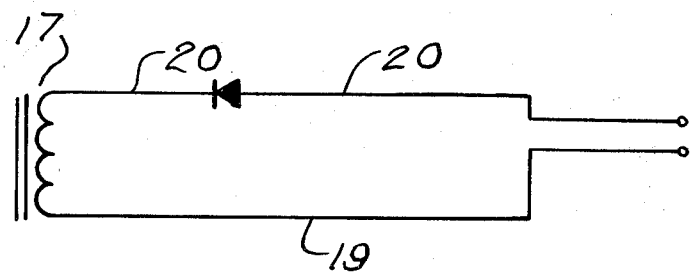
FIG. 2 is a schammatic wiring diagram of the invention.

According to this invention, an electrical device 10 is shown to include a hollow rectangular base11 upon which is fixedly secured a figurine 12 having a flexible pole 13 extending therefrom. A line 14 is secured fixedly to the extending end of pole 13 and has secured at its opposite end a fish 15 having a permanent magnet 16 secured fixedly in the tail thereof. The magnet 16 is spaced above the top surface of base 11 for freedom of movement of the fish 15.

An electro-magnetic coil 17 is fixedly secured within base 11 in alignment with the fish 15 above the base 11. The electro-magnetic coil 17 is wired in series with a switching rectifier 18 by means of wires 19 and 20 which extend into cord 21 having plug 23 for being received within an electrical outlet.

When plug 23 of cord 21 is plugged into an electrical outlet, the intermittent current flow within the magnetic coil 17, causes the fish 15 by means of its magnet 16, to move back and forth and up and down, the up and down motion being affected by means of the pole 13 within the figurine 12.

Figure 3:
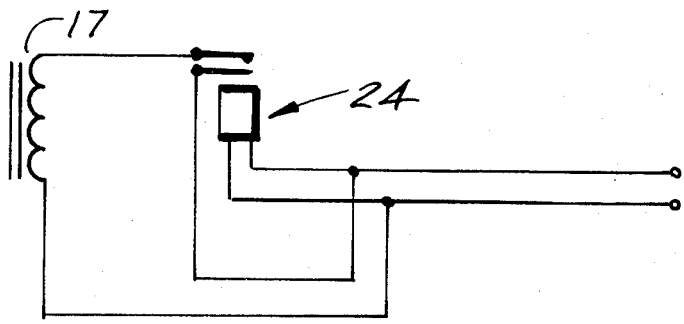
FIG. 3 is a modified schammatic wiring diagram, of the invention.

As shown in FIG. 3 of the drawing, a modified form of the switching is effected by means of the relay 24 which is wired to electro-magnetic coil 17 as a modified means for the movement of fish 15.

What I now claim is:

1. A Slowed Alternating Current Magnetic Novelty, comprising in combination, a hollow base, an electromagnetic coil and a switching means within said base, means for producing an electromagnetic force, a figurine fixedly secured upon said base, said figurine holding one end of a fishing pole, a flexible line secured to the other end of said pole, the free end of said line being attached to a simulated fish having a permanent magnet secured therein, said simulated fish accordingly depending vertically in downwardly direction due to gravity, said simulated fish magnet being within a magnetic field of said electromagnetic force whereby said electromagnetic force causes said gravity depending simulated fish to move toward said coil producing an animated like movememt of said simulated fish.

* * * * *